Dec. 30, 1969  W. E. MILLER  3,486,334
HYDRAULIC POWER TRANSMISSION CONTROL
Filed May 16, 1968  3 Sheets-Sheet 1

INVENTOR.
WENDELL E. MILLER
BY Hubert Miller
ATTORNEY

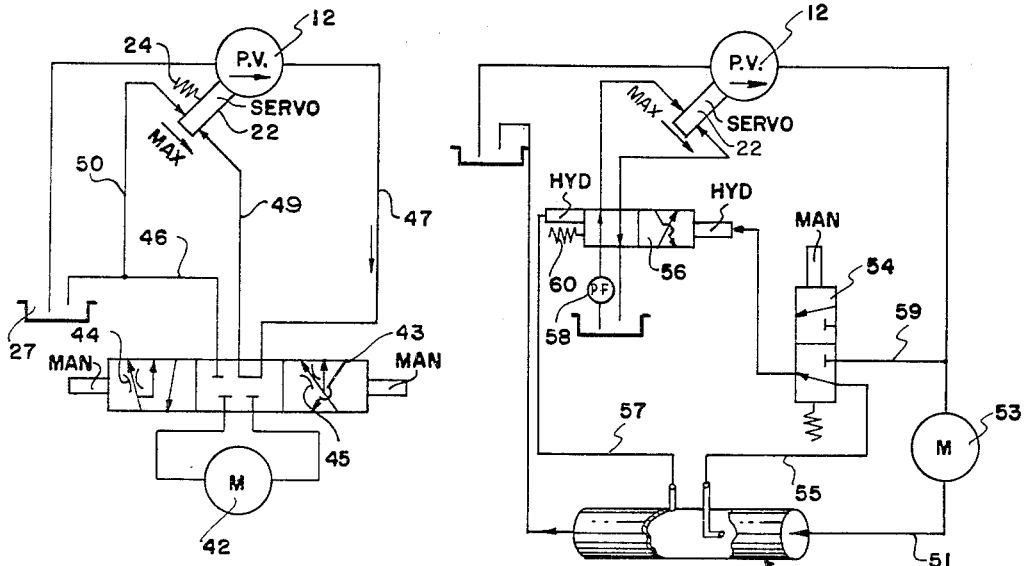
FIG. 4
FIG. 5
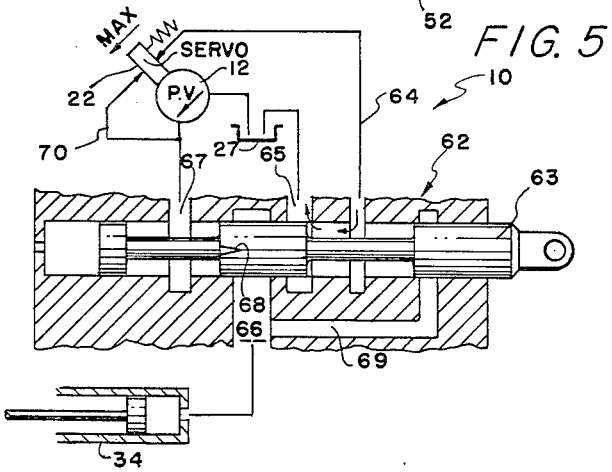
FIG. 6
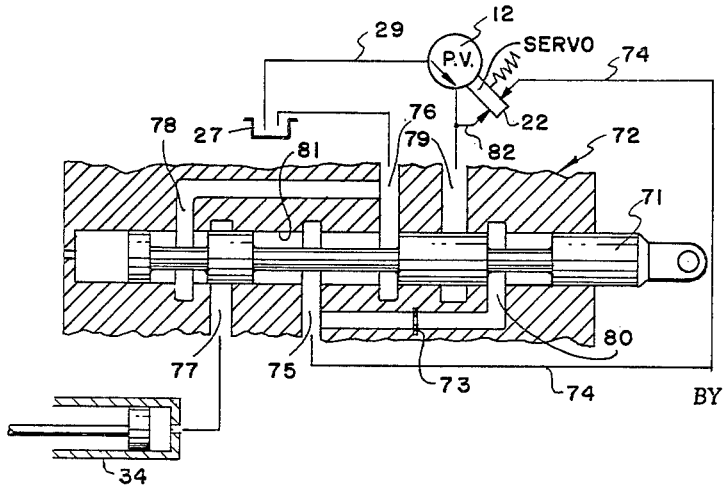
FIG. 7
INVENTOR.
WENDELL E. MILLER United States Patent Office 3,486,334
Patented Dec. 30, 1969

3,486,334
HYDRAULIC POWER TRANSMISSION CONTROL
Wendell E. Miller, Warsaw, Ind., assignor to The Cessna
  Aircraft Company, Wichita, Kans., a corporation of
  Kansas
    Filed May 16, 1968, Ser. No. 729,622
  Int. Cl. F15b 15/18; F16d 31/06; F04b 1/02
U.S. Cl. 60—52                                      9 Claims

ABSTRACT OF THE DISCLOSURE

The invention is a control for efficiently varying the displacement of a variable delivery pump to meet the changing demands of one or more fluid motors in a fluid energy translating system. A flow sensing device positioned in the discharge or return line of the pump senses the actual flow compared with a desired flow and accordingly signals a servo to vary the pump displacement until the desired flow is achieved. An additional control, when actuated, generates a false flow signal at the servo, indicating that the actual flow is much greater than the desired flow, whereby the servo reduces the pump displacement to a minimum, regardless of the actual flow. This reduction in pump displacement relieves the pump from having to maintain an unneeded relatively high pressure in the pump discharge conduit.

---

Fluid power transmissions generally include two or more fluid energy translating devices, one of which functions as a variable displacement pump and the others as fluid motors. More particularly, the present invention relates to a control which varies the displacement of the pump, in such a transmission, to efficiently supply only the flow necessary to drive the motor or motors at a constant speed. If the pump discharge flow is less than the needs of the motors, the control senses the deficiency and causes the displacement of the pump to increase. If the flow is greater than is required, the control decreases the displacement. When flow to the motor is cut-off by a control valve (standby condition), a false flow signal is generated which decreases the pump displacement substantially to zero, and provides a minimum system pressure.

In some of the prior art transmissions, the pump maintains either the pressure or flow rate, or both, at operating levels at all times. Systems of this type are very inefficient whenever the motor is not making use of the available energy delivered by the pump. In such systems there are basically two methods of protecting the pump when flow is blocked to the motor or the motor reaches an impasse. The first is a pressure relief valve in the pump discharge, and the second a pressure responsive control which decreases the pump discharge when a preset maximum pressure is exceeded. In both methods, energy is wasted when there is no flow to the motor. While there are numerous prior art systems, such as shown in Patent No. 2,845,876, which have automatic flow and pressure compensation controls, none of them have efficiency levels comparable to that of the present invention.

It is therefore the principal object of the present invention to provide an improved and more efficient control for a variable delivery hydraulic system.

An additional object of the invention is to provide a control having a separate false flow signal which reduces the pump displacement to a minimum, regardless of the flow signals being produced by the actual flow in the system.

Still another object of the invention is to provide a control which generates a separate false flow signal when fluid flow to the device being actuated is interrupted, and causes the pump displacement to decrease to essentially zero, thereby reducing the horsepower consumption, heating effects and efficiency losses of the system to a minimum.

The invention will be more clearly understood when the following description is read in connection with the accompanying drawings in which:

FIG. 4 is a schematic view of such a system with still another modified form of the invention;

FIG. 5 is a schematic view of such a system with an additional modified form of the invention;

FIG. 6 is a partially schematic view, showing in axial section, a modified form of the three-way control valve of the FIG. 2 embodiment;

FIG. 7 is a further modified form of the FIG. 2 control valve; and

Figure 1:
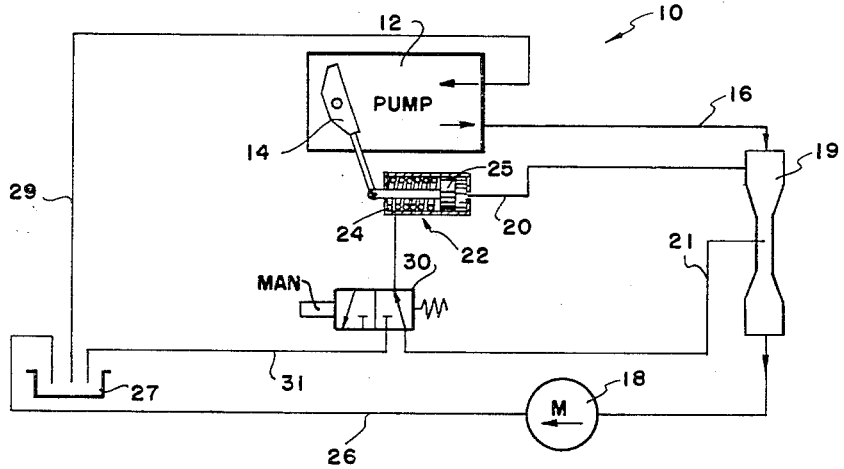
FIG. 1 is a schematic view of a system including a variable delivery pump supplying motive fluid to a motor with compensating controls which embody the present invention.

Referring now to the drawings, and more specifically to FIG. 1, which illustrates one form of the compensating control in a hydraulic drive system, all of which is generally identified by reference numeral 10. Pump 12 is a conventional axial piston positive displacement pump having a tiltable swash plate 14 positioned for maximum displacement. Briefly mentioning its operation, the tiltable swash plate 14 bears against a number of pistons in a rotating cylinder block (not shown) causing the pistons to reciprocate and discharging fluid through line 16. As the swash plate 14 is tilted in a clockwise direction, the displacement of the pump is decreased until it reaches the no-flow vertical position seen in FIG. 2. Since the pump structure is conventional and not a part of the invention, only the swash plate 14 is shown in the drawings.

The pump 12 supplies motive fluid through conduit 16 to operate a motor 18 at a constant speed. The pump swash plate 14 is angularly positioned by a displacement control servo cylinder 22. Positioned in conduit 16 is a venturi-type flow-sensing device 19 which acts as a flow-to-pressure transducer through a pair of pressure sensing lines 20 and 21 connected to the servo 22. As fluid flows through the venturi, a pressure drop is created in the sensing lines relative to the rate of flow to the motor. When the flow rate exceeds, a predetermined amount, the pressure experienced on the head end of servo 22 overrides the combined force of the pressure in the rod end, and the spring 24, to move piston 25 to the left, reducing the pump displacement. When there is no pressure differential (no flow) in the sensing lines 20 and 21, the spring 24 biases the piston 25 to the right, increasing the pump displacement until the system equalizes at a set flow rate.

Positioned in sensing line 21 is a false flow valve 30, spring biased in its uninterrupting position as seen in FIG. 1. When valve 30 s actuated, it creates a false flow indication at the servo 22 by blocking the downstream sensing line 21 and venting the rod end of servo 22, to reservoir 27 through line 31. When the rod end at atmospheric pressure, a false pressure differential is created across piston 25, indicating a much greater flow through conduit 16 than actually exists. The effect of venting the rod end of servo 22, is to change the pump control from a flow compensating control to a minimum pressure compensating control.

In the absence of false flow valve 30, some type of fluid relief means would be necessary in a situation where flow to the motor is blocked. This is necessary as a result of the no-flow condition which inherently causes spring 24 to move the servo piston 25 to a position of increased displacement. One example in the prior art, is a pressure compensating valve which will reduce the pump displacement to essentially zero when flow is blocked while maintaining a relatively high system pressure. The pump in such a system will be required to operate against a high back pressure which consumes wasted power and reduces the efficiency of the system. The presence of false flow valve 30 under such conditions relieves the back pressure by creating a false pressure differential across the piston 25 which reduces the pump displacement to a minimum. Thus the valve 30 is effective in a standby condition to maintain a relatively low pump back pressure, thereby reducing the horsepower consumption by the pump and the potential energy losses in the system. Valve 30 can also function as a stop and start control valve for the system, assuming the minimum pressure necessary to turn the motor 18 is greater than the minimum pressure generated by the pump 12 in the false flow position.

FIG. 2 EMBODIMENT

Figure 2:
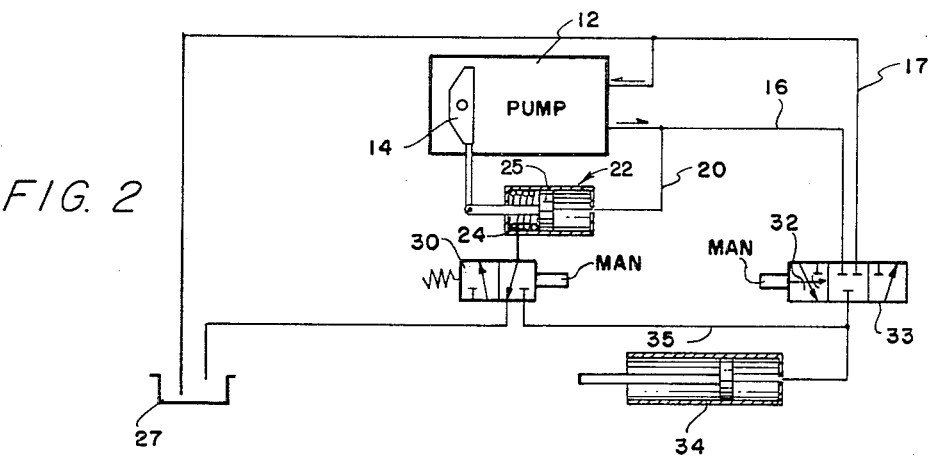
FIG. 2 is a schematic view of such a system with a modified form of flow-sensing device.

In this figure the invention is shown with a modified form of flow-sensing device. Rather than a fixed venturi, as seen in FIG. 1, the device is a variable orifice type restrictor 32 incorporated in a three-way directional control valve 33. The pressure sensing lines 35 and 20 are connected to conduit 16 downstream and upstream respectively, of the restrictor 32. The pump 12 supplies fluid to a single action linear motor 34 through control valve 33. The speed and travel of motor 34 can be varied by changing the flow rate across restrictor 32. To stop the motor, valve 33 is moved to the center flow-blocking position and valve 30 is moved to its false signal position, as seen in FIG. 2. With the rod end of servo 22 vented to reservoir 27, the pressure in line 20 immediately overcomes spring 24 and decreases the pump displacement to a zero flow condition while maintaining a nominal pump pressure.

In the absence of false flow valve 30 (prior art system), substantial standby pump pressures can be experienced under certain conditions. For example, if valve 33 is moved to its flow-blocking position, while motor 34 is lifting a heavy load, the static load from the motor is experienced at the rod end of servo 22 through sensing line 35. The servo 22 will reduce the pump displacement, but it will maintain a high standby pressure equal to, for example, a static load pressure of 1000 p.s.i. plus 100 p.s.i. exerted by spring 24, for a total of 1100 p.s.i. In contrast, with the use of valve 30, the pump standby pressure would be only 100 p.s.i., since the rod end of servo 22 is vented to atmosphere.

When valve 33 is moved to the return position, fluid is vented from motor 34 to reservoir 27 via conduit 17.

While valve 30 normally actuates to its false flow position in conjunction with the movement of valve 33 to its center flow-blocking position, it can also be actuated by additional means such as a stroke-limiting micro-switch.

FIG. 3 EMBODIMENT

This figure illustrates a further application of the invention, in which the false flow valve is incorporated with a directional control valve 48 and the flow-sensing device is a separate variable orifice restrictor 37. The pump 12 supplies fluid to a double acting linear motor 36 through a four-way directional control valve 48. Sensing lines 20 and 39 are connected upstream and downstream respectively of a manually controlled variable orifice restrictor 37 which can be used to vary the speed level of motor 36. When control valve 48 is in the center flow-blocking position, the rod end of servo 22 is vented to reservoir 27 via lines 39 and 40, thus creating a false flow indication at the pump displacement servo 22. In the right and left hand positions of directional control valve 48, line 39 senses the pressure in pump discharge conduit 38 so that the pump 12 is flow-compensated as it moves the motor 36 in either direction.

FIG. 4 EMBODIMENT

Figure 3:
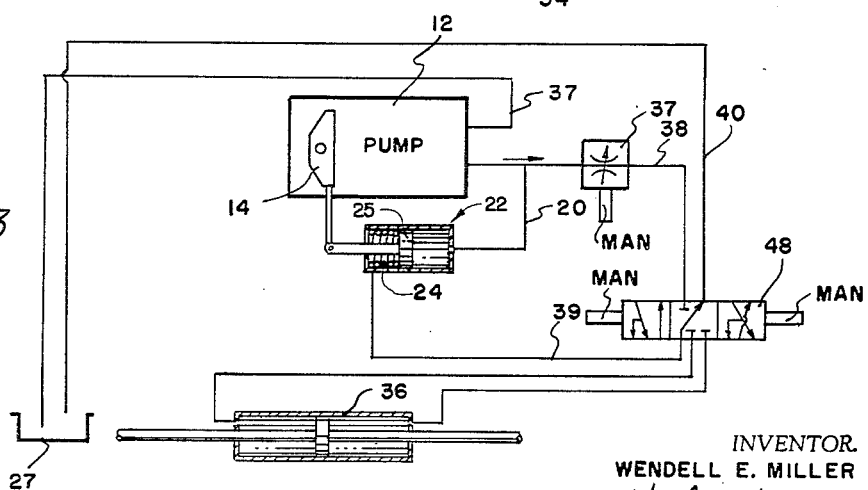
FIG. 3 is a schematic view of such a system with a further modification.

In this embodiment the directional control valve 43 not only includes the false flow valve as in FIG. 3, but also the flow sensing device, shown as fixed flow restrictors 44 and 45. The pump 12 (symbolically shown) supplies motive fluid to a reversible motor 42 through the four-way directional valve 43. Contrary to the previous embodiments, the flow sensing device is located in the motor return conduit 46, rather than the pump discharge conduit 47. Accordingly, the false flow valving means is interposed in the upstream sensing line 49 rather than the downstream line 50 as in the previous embodiments. In operation, with valve 43 in the left hand position, the motor discharge flow in line 46 is metered through restrictor 44. The flow rate is sensed through upstream and downstream lines 49 and 50 which accordingly position servo 22. When valve 43 is moved to the center flow blocking position (as illustrated), a false flow is indicated at the servo 22. The false flow indication is generated by directly porting the pump discharge flow in conduit 47 into sensing line 49, causing the pump to reduce its displacement substantially to zero and its output pressure to a minimum. With the valve 43 in the right hand position, the discharge flow from the right side of motor 42 is metered across restrictor 45 into line 46, causing the motor to rotate in the opposite direction.

FIG. 5 EMBODIMENT

In this figure the invention is illustrated with an additional type of pitot-type flow sensing device 52 positioned in the motor return line 51. A device of this type would be desirable by reason of its low back pressure or minimal energy loss. The false flow valve 54 is a separate valve interposed in sensing line 55. The pitot flow device 52 includes a first sensing line 55 in the center of the conduit open to the dynamic effects of the moving fluid and a second line 57 sensing the static pressure in the conduit 51. The magnitude of the pressure differential created in lines 55 and 57 being very slight, amplification is required. Pilot valve 56 and pump 58 are added to amplify the signal transmitted to servo 22.

In operation the pump 12 is flow compensated in accordance with the pressure differential created across the Pitot tube device 52 in the motor return line. False flow valve 54 being normally spring biased in the position shown in the drawing, the pressure differential in lines 55 and 57 is experienced by the opposing ends of pilot valve 56. Pilot valve 56 is normally spring biased in the straight through position, as illustrated, permitting fluid from low pressure pump 58 to move the pump displacement servo 22 to a maximum displacement position. When the prearranged flow rate in conduit 51 is exceeded, the pressure differential in lines 55 and 57 overcomes spring 60 and moves valve 56 to the criss-cross position, causing fluid pressure to enter the opposite end of servo 22 and reduce the pump displacement. When it is desired to give the controls a false flow signal, for example when motor 53 is stopped, valve 54 is actuated, permitting the direct pump discharge pressure in line 59 to be experienced by the right end of valve 56. The high pressure in line 59 immediately shifts valve 56 to the criss-cross position, causing the servo 22 to reduce the pump displacement to a minimal flow condition.

The pitot-type flow sensing device along with the amplified signal can be used in any of the previously mentioned embodiments. While only a few different types of sensing devices have been illustrated in previously mentioned figures, any flow measuring device creating a pressure differential could be utilized with the present invention.

FIG. 6 EMBODIMENT

FIG. 6 illustrates a different variation of the three-way directional control valve 33 shown schematically in FIG. 2. Spool 63 and its associated passages act as both a variable restrictor and a false flow valve. As shown in the drawing, spool 63 is in the center flow blocking position with the pump servo 22 experiencing a false flow indication. The false flow is indicated by opening sensing line 64 to atmosphere through passage 65. As spool 63 is moved to the left, a return flow from motor 34 to reservoir 27 is permitted via passages 66 and 65. Sensing line 64 remains open to passage 65 to indicate a false flow, keeping the pump displacement at a minimum during the return stroke. When spool 63 is moved to the right, from the flow blocking position, flow from pump 12 is metered across variable orificing grooves 68 to actuate linear motor 34. Sensing line 64 previously vented to atmosphere is closed to passage 65 and opened to passage 69. The pressure downstream of restrictor 68 is sensed by servo 22 via line 64 and passage 69 while the upstream pressure is sensed in line 70. While the spool 63 is in the actuating position, the pump 12 is flow compensated by servo 22 in accordance with the pressure differential created across grooves 68.

FIG. 7 EMBODIMENT

FIG. 7 illustrates another modified directional control valve 72, distinguished from the FIG. 6 embodiment by using a fixed restrictor 73 independent of spool 71. The false flow indication is generated in the center flow blocking position, ase shown, by connecting line 74 to atmosphere via passages 75 and 76. The false flow is also indicated in the motor return position (spool 71 moved to the right) when passage 77 is opened to drain passage 78. To actuate motor 34, spool 71 is moved to the left, terminating the false flow indication as the spool blocks passage 76. Further movement to the left opens a fluid path between pump 12 and motor 34 via passage 79, passage 80, passage 75, bore 81 and passage 77. The flow rate to the motor 34 is sensed downstream by line 74 and upstream by line 82 to accordingly compensate the displacement of pump 12.

FIGS. 8, 9, AND 10

Figure 8:
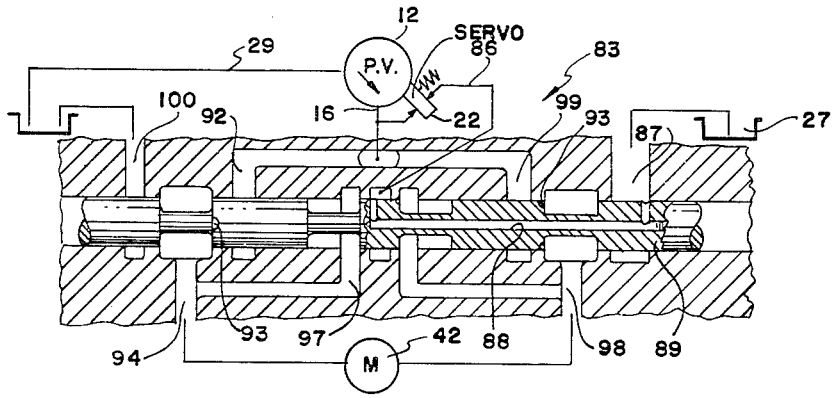
FIGS. 8 through 10 are views of modified forms of the control valve of the FIGS. 2 and 3 embodiments.
Figure 9:
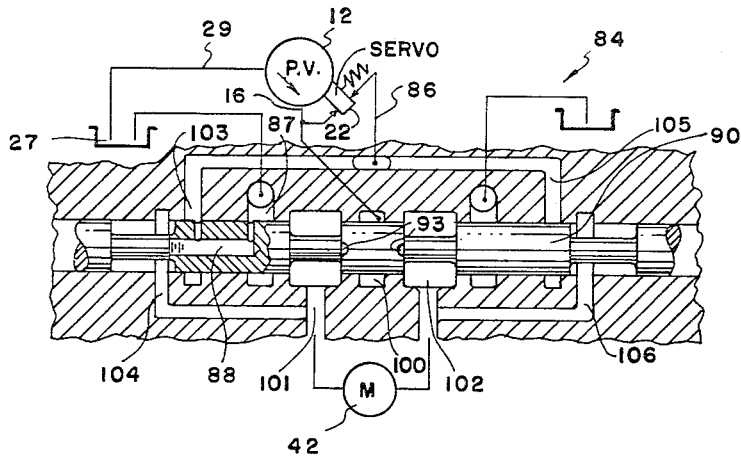
Figure 10:
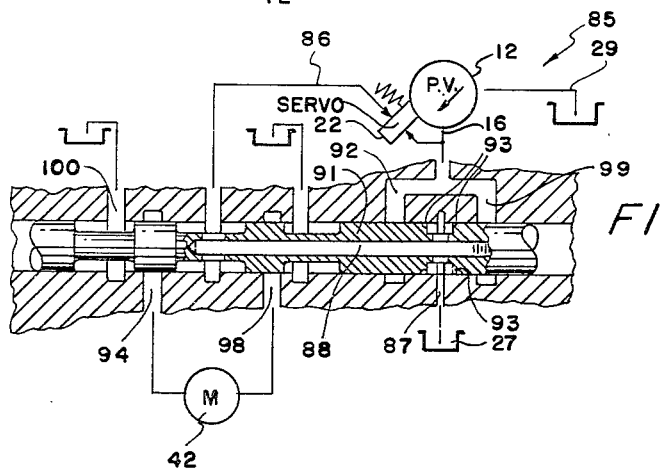

FIGS. 8, 9 and 10 illustrate three variations of the four-way directional control valve 43 (shown schematically in FIG. 4). The flow sensing device in each of these figures is located in the pump discharge conduit rather than the motor return conduit as in FIGS. 4 and 5. In all three valves 83, 84 and 85 (FIGS. 8, 9 and 10), the false flow indication is generated in the center flow blocking positions by venting downstream sensing line 86 to reservoir 27 via center spool passage 88 and passage 87 in the respective spools 89, 90 and 91.

In valve 83 (FIG. 8), when the spool 89 is moved to the right, fluid from passage 92 is metered across the variable restriction 93 to passage 94. Simultaneously, the opposite motor passage 98 is opened to reservoir 27 and the sensing line 86 is closed to passage 87 and opened to passage 97. Sensing line 86 is now sensing the downstream pressure of variable restrictor 93 so that the servo 22 will accordingly compensate the flow from pump 12. Moving the spool 89 to the left reverses the flow to motor 42 causing fluid from passage 99 to orifice across variable restrictions 93 into passage 98. Any fluid that may flow from passage 94 through passage 97 and spool passage 88 to drain is incidental, since passage 94 is already draining through passage 100.

In valve 84 (FIG. 9), when the spool 90 is moved to the right, fluid from passage 100 is metered across variable restrictions 93 to passage 101. The pressure is sensed downstream in motor passage 101 via passages 104, 103 and line 86. Conversely, if spool 90 is moved to the left, the motor 42 will rotate in the opposite direction as fluid is metered from passage 100 to passage 102. The pressure is sensed downstream in motor passage 102 via passages 106, 105 and line 86 to accordingly regulate the displacement of pump 12.

Valve 85 (FIG. 10), is similar to valve 83 of FIG. 8, as can be seen by the same numerals for like elements. The center spool passage 88 in this figure not only drains sensing line 86 to atmosphere in the flow blocking position, but also carries motive fluid from the pump to the motor in the other two valve positions. The restriction creating the pressure differential is caused by metering the flow across variable restrictions 93 as the fluid enters center passage 88. When spool 91 is moved to the right, from the position shown, passage 88 is first cut-off from exhaust passage 87 and then is opened to pump discharge passage 99. Fluid now flows from the pump to the motor via passage 99, restriction 93, center passage 88, and motor passage 98. Simultaneously, motor return passage 94 is opened to return passage 100. In all three of the valves just described in FIGS. 8, 9 and 10, the false flow indication is only generated when the valve is in the center flow blocking position. Upon movement in either direction from the center position, the exhaust passage 87 is cut-off from the sensing line 86.

FIGS. 6 through 10 are only examples of how the control circuitry of this invention may be incorporated in directional control valves and that variations from these illustrations may be made without departure from the spirit and scope of the invention. Therefore, the drawings and the specification are to be considered as merely illustrative rather than limiting.

Having described the invention with sufficient clarity to enable those familiar with this art to construct and use its general principles, I claim:

1. In a fluid energy transmission system which includes a driven variable displacement pump, a movable element (14) for varying the displacement of the pump, a servo (22) having a piston operably connected to move said movable element to vary the pump displacement in response to different pressures in the two chambers located on opposite sides of the servo piston, and conduit means interconnecting the pump to at least one motor in a driving, a re-circulating relation, an improved control for such system comprising:

a flow-to-pressure transducer means (19, 32, 44, 52), which incorporates a flow restriction, interposed in said conduit means, and capable of generating a pressure differential upstream and downstream of the restriction, which is proportional to the flow through the conduit means;

sensing passages affording communication between the respective servo chambers and said conduit means at points respectively upstream and downstream of the flow restriction, whereby a pressure differential is imposed across the servo piston, actuating same to increase or decrease pump displacement to maintain a predetermined flow rate through the conduit means; and false flow signaling valve means interposed in one of said sensing passages, having a first position in which the said one sensing passage communicates with its connected servo chamber, and having a second position in which such communication is blocked thereby establishing an artificial difference in pressure between the two servo chambers, and signaling a false and excessive flow to the servo, which false flow signal causes the servo to reduce pump displacement to a minimum.

2. The control described in claim 1 in which the restriction and the points at which the sensing passages communicate with the said conduit means are all located upstream from the motor.

3. The control described in claim 1 in which the restriction and the points at which the sensing passages communicate with the said conduit means are all located downstream from the motor.

4. The control described in claim 1 in which the said valve means, in its said second position simultaneously establishes communication between the said connected servo chamber and atmospheric pressure.

5. The control described in claim 1 in which the restriction in said transducer means is of the variable flow type.

6. The control described in claim 1 in which the transducer means and its restriction (44), as well as the false flow signaling valve means, are incorporated in a manually operable directional control valve, and the directional control valve has a first position in which the restriction and the sensing passages are located downstream from the motor, and has a second position blocking communication between one servo chamber and its connected sensing passage while simultaneously establishing communication between the other servo chamber and said conduit means at a point upstream from the motor.

7. A hydraulic pump displacement control as set forth in claim 1 in which the transducer is a Pitot tube type flow sensing device (52),
and means in one sensing passage (56, 58) for amplifying the pressure signal from the Pitot tube, whereby the amplified signal actuates the pump servo.

8. The control described in claim 1 in which the transducer means and its restriction (44), as well as the false flow signaling valve means are incorporated in a manually operable directional control valve interposed in said conduit means, and the directional control valve has a first position in which the two sensing passages communicate with the two servo chambers on opposite sides of the restriction, and has a second position blocking communication between one servo chamber and its connected sensing passage, while simultaneously establishing communication between the other servo chamber and atmospheric pressure.

9. A hydraulic pump displacement control as set forth in claim 1 including adjustable biasing means connected to the servo piston, urging same toward a maximum pump displacement position, whereby when the pressure differential experienced across the servo drops below the force exerted by the biasing means, the servo is actuated by the biasing means.

References Cited

UNITED STATES PATENTS

| | | |
|---|---|---|
| 2,285,069 | 6/1942 | Vickers. |
| 3,246,471 | 4/1966 | Goodale. |
| 3,429,123 | 2/1969 | Burroughs. |

EDGAR W. GEOGHEGAN, Primary Examiner

U.S. Cl. X.R.

60—53; 103—162